J. BILL.
ELECTRICALLY HEATED STAMPING MACHINE.
APPLICATION FILED APR. 4, 1918.

1,392,553.

Patented Oct. 4, 1921.
6 SHEETS—SHEET 2.

Inventor
Jean Bill

By Knight Bro.
his Attys

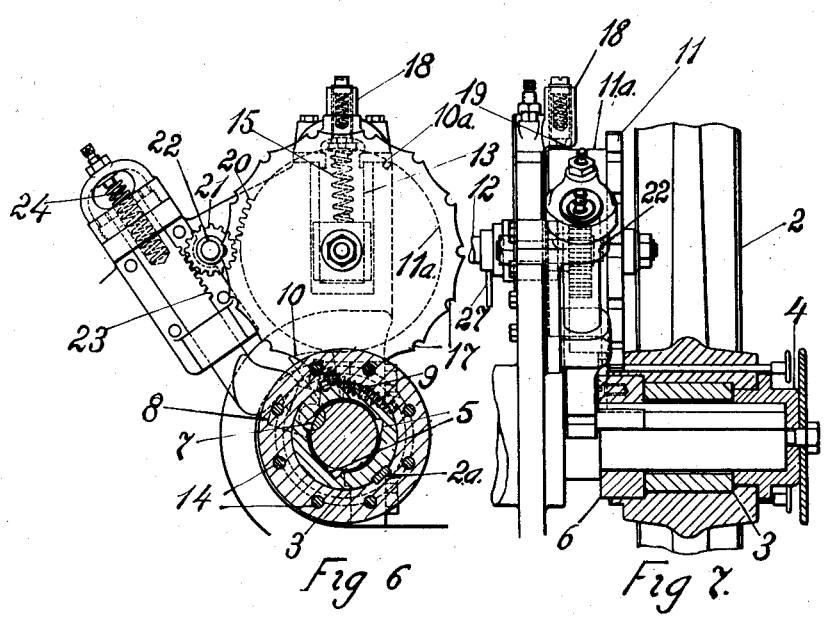
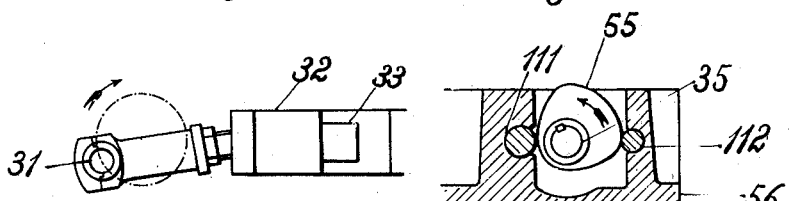
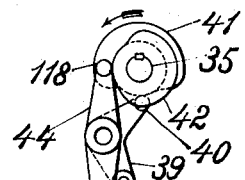
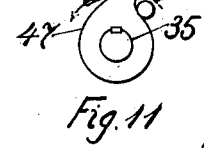
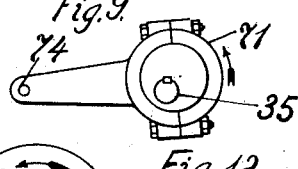
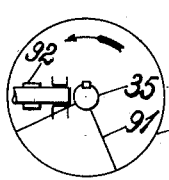

UNITED STATES PATENT OFFICE.

JEAN BILL, OF LEGNANO, ITALY.

ELECTRICALLY-HEATED STAMPING-MACHINE.

1,392,553. Specification of Letters Patent. Patented Oct. 4, 1921.

Application filed April 4, 1918. Serial No. 226,629.

*To all whom it may concern:*

Be it known that I, JEAN BILL, employee, subject of Switzerland, resident of Legnano, in the Kingdom of Italy, have invented new and useful Improvements in Electrically-Heated Stamping-Machines, of which the following is a specification.

The present invention relates to a stamping machine, wherein the part to be stamped is electrically heated, and is particularly adapted for machines in which pieces such as rivets, bolts and the like are manufactured in series. Its main features consist in the fact that it works automatically, and that electric current is employed for heating the parts to be stamped; thus doing away with the use of any fuel and diminishing the cost of operation, while at the same time the production is increased and a more uniform heating is obtained.

In the annexed drawings:

Fig. 6 is a front view of the trip mechanism;

Fig. 7 is a side view of the trip mechanism;

Figs. 8 to 13 diagrammatically show the relative position of the driving mechanism when the machine is in inoperative position; and, more specifically, Fig. 8 shows the position of the main crank;

Fig. 9 the position of the cam which actuates the shearing mechanism;

Fig. 10 the driving cams which actuate the electrodes near the stamp;

Fig. 11 the driving cams which actuate the ejector mechanism;

Fig. 12 the eccentrics which actuate the electrical contacts and

Figure 2:
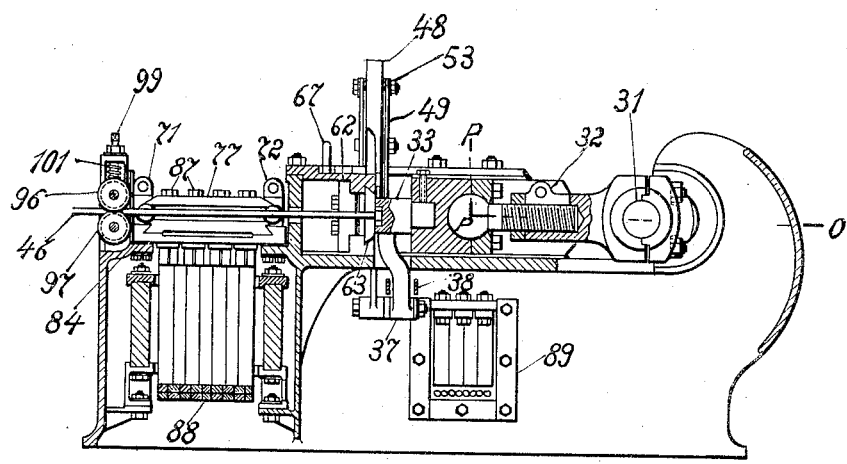
Fig. 2 is a longitudinal section through A B Fig. 1.
Figures 14, 15:
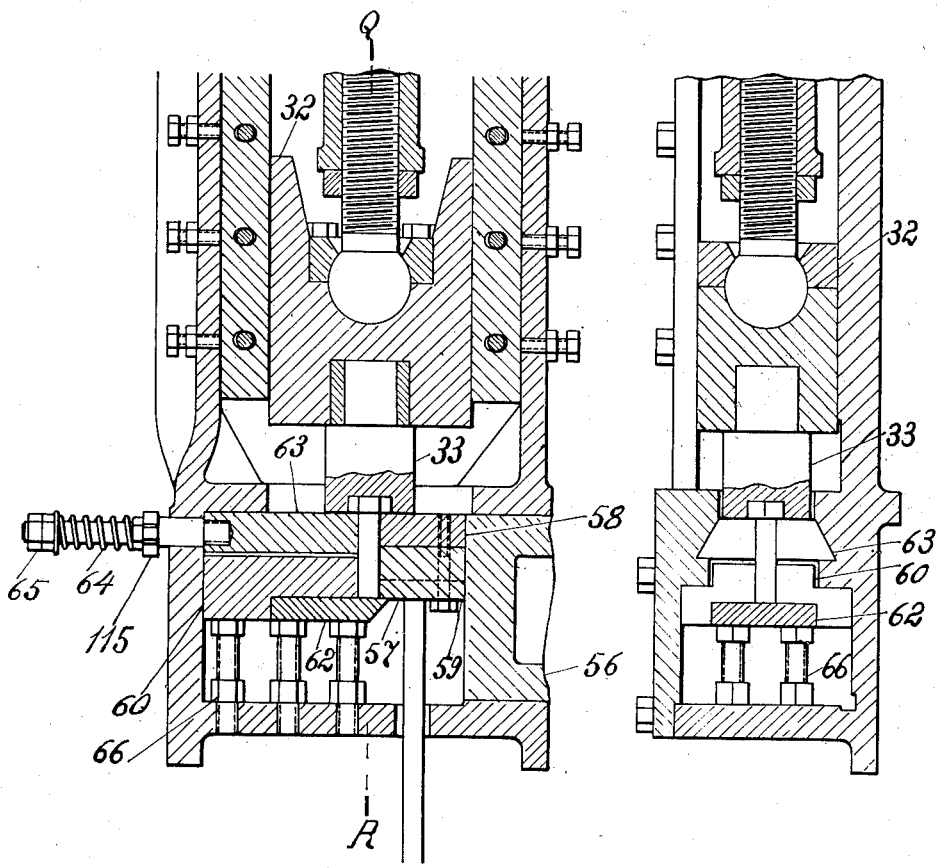
Figure 16:
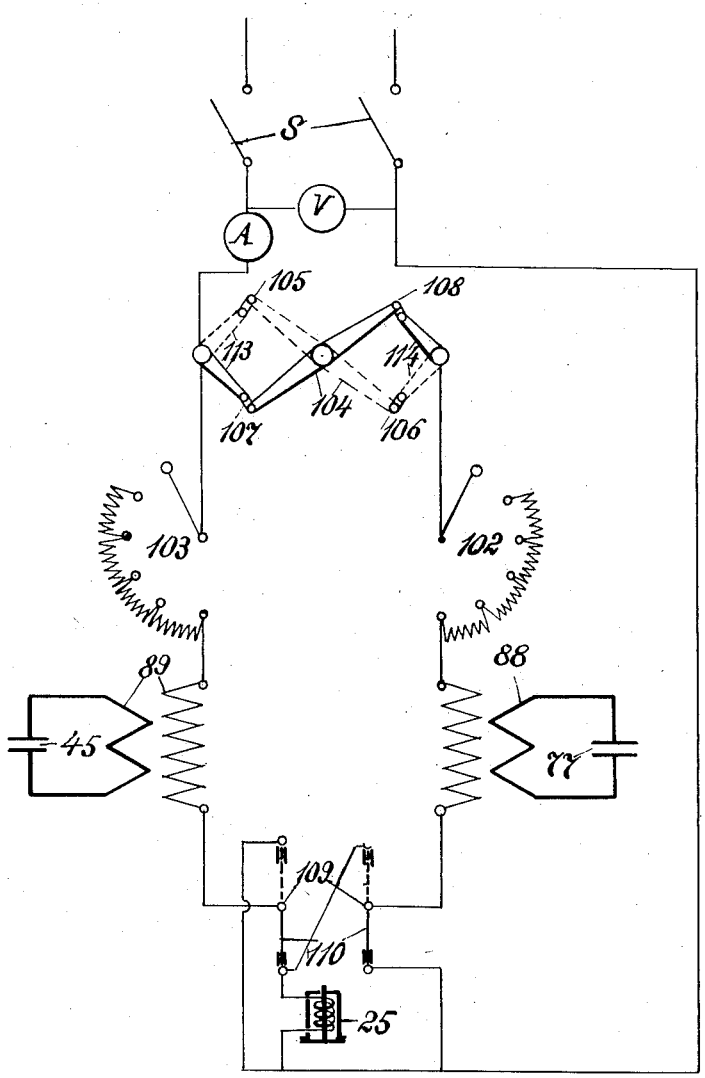

Fig. 13 the disk which actuates the feeding device;

Fig. 14 shows the section of the central part through O P (Fig. 2);

Fig. 15 shows a section of the central part through C R (Fig. 14);

Fig. 16 is a diagram showing the electrical connections.

The machine essentially consists of the following parts:

(1st) A press with one crank shaft, which receives its motion from the flywheel, which latter has an electric trip or snapping mechanism;

(2nd) A central part provided with a stamp or die to shape the piece to be stamped;

(3rd) A camshaft for transmitting the motion from the crankshaft, and a cam actuating the cross-slide for the shearing mechanism.

At the end of the camshaft a friction disk is provided to operate the feeding mechanism which feeds in the bar from which the bolts are made.

Of course the shape and details of the various parts may vary from those shown and described without departing from the main idea of the invention, as described and claimed in the appended claims.

1 is the crankshaft, which has at one end the flywheel 2 keyed on the steel sleeve 3 (Fig. 6) having the three grooves 5. On the shaft 1 are fitted the two sleeves 4 and 6 (Fig. 7), on which the flywheel 2 turns during the rest period.

In a groove of the shaft 1 a trip key 7 is rotatable which has its end —8— nose shaped. This end is held by the sleeve 6 and tends to rotate owing to the action of the spring 9. On the sleeve 6 the cam 10 is fixed.

Figure 1:
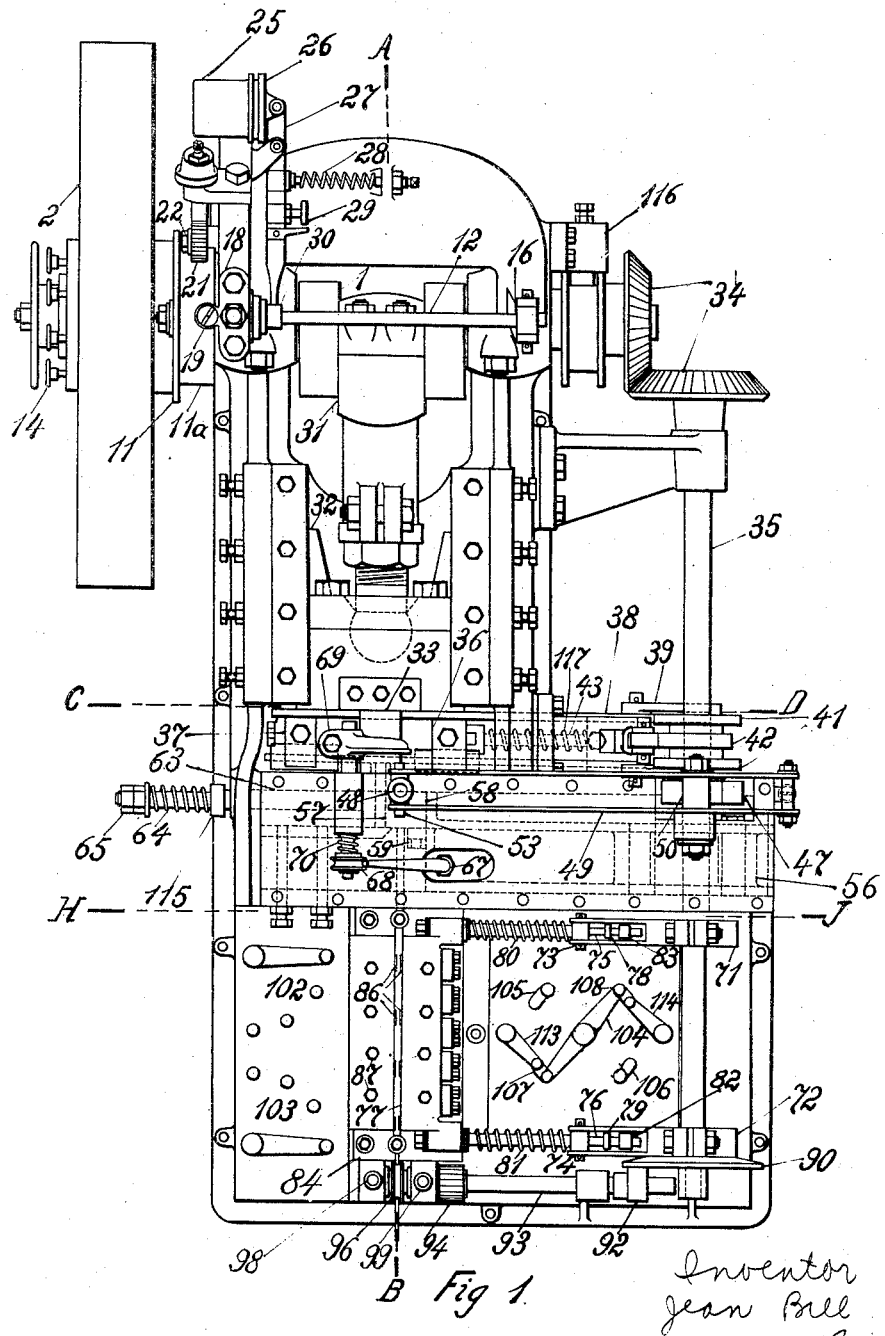
Figure 1 is a general top view.
Figure 3:
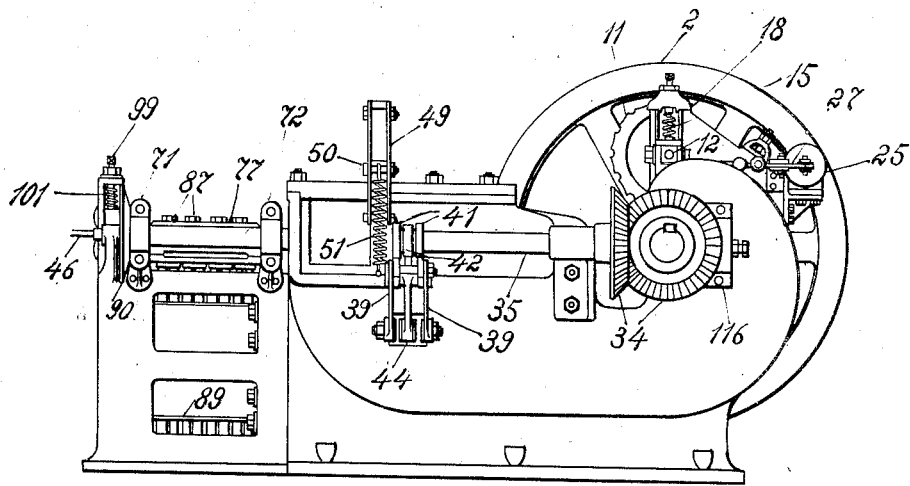
Fig. 3 is a side view.

On the axis of the flywheel 2 is mounted the vertically movable trip wheel 11, with sleeve 11ª which rotates freely on the axis 12 fulcrumed at 16 (Fig. 1) and has a vertical motion in the guides 13, under the action of the spring 15, until the trip wheel 11 comes to the position at the side of the flywheel where the notches 17 engage the studs 14 and thus drive the trip wheel. On the guides 13 is mounted the cover 18 provided with a set screw for the spring 15. On the same cover is placed the stop stud 19 which engages the notch 10ª for the stop position of the wheel 11. The sleeve 11ª has at its periphery a toothed segment 20 which at a predetermined moment drives the pinion 21 which is loosely mounted on the stud 22. The pinion 21 meshes with the rack of the stop stud 23, which is raised against the action of the spring 24 to release the nose 8 of the key 7 which latter under the tension of the spring 9 comes to lie in the groove 5 so that the crankshaft rotates rigidly with the flywheel. At the side of the trip wheel is mounted the electromagnet 25 (Figs. 1 and 3) which has a movable armature 26 fulcrumed at the end of the lever 27. Under the action of the electromagnet 25 and against the action of the spring 28 the end of the lever 27 gets free from the sleeve 30, on the shaft 12, the trip wheel 11 drops and is rotated whereby the notches 17 are brought against the studs 14. On the lever 27 is screwed the setscrew 29.

On the shaft 1 is the crank 31 which drives the slide 32 (Fig. 1) to which is fixed the movable stamp 33 which stamp the blanks.

Figure 4:
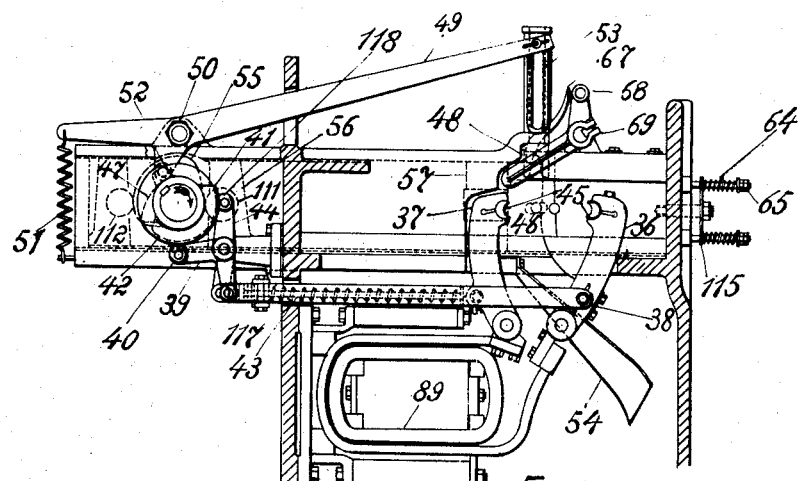
Fig. 4 is a cross section through C D (Fig. 1)

On the opposite side of the flywheel (Figs. 1 and 3) are a pair of bevel gears 34 driving the camshaft 35. This camshaft moves movable contacts 36—37, contacts 36 being connected by the rods 38 to the crankbell lever 39 having rolls 40 working on the two cams 41, Figs. 3 and 4); and the contact 37 being connected through the rod 43 between the two rods 37 to the straight lever 44 arranged between the two levers 39. The lever 44 has at its end the roll 118 which coöperates with the cam 42; this latter cam forms with the two cams 41 one solid piece keyed on the camshaft 35. The spring 117, on the rod 43, actuates the two contact levers 36 and 37, which are brought toward each other until the ends 45 come in contact with the bar 46; the cams 41 and 42 work against the action of the spring 117 and tend to open the two contact arms 36 and 37. The cam 47 drives the ejector 48 (Fig. 4) by means of the lever 49 fulcrumed on the axle 50. The spring 51 fixed to the casing holds the roll 52 at the end of the lever 49 in contact with the cam 47. The lever 49 gives a vertical motion to the ejector 48 which slides in the guides 53 and the stamped piece is projected in to the discharging channel 54.

On the camshaft 35 is also keyed the cam 55 which drives the cross slide 56 of the shearing mechanism. This cam 55 acts on two rolling pins 111 and 112 which are loosely mounted in the cross slide 56 parallel to the cam 55, so as to impart a cross motion to the slide 56. On the opposite end of the cross slide 56 is bolted the movable knife 57 fixed to the piece 58 by bolt 59 between two walls 60ᵃ projecting from the slide 56.

Figure 5:
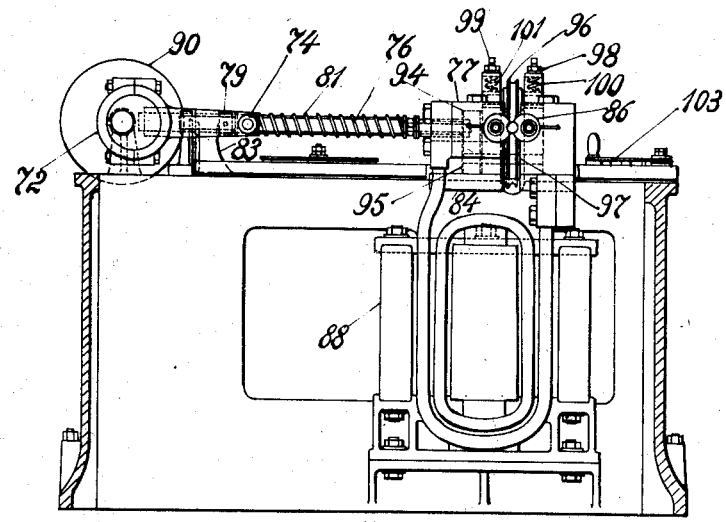
Fig. 5 is cross section through H J (Fig. 1)

On the opposite side is arranged an interchangeable strip 60 to which the knife 62 is bolted. The bar 46 is cut by the knife owing the motion of the slide 56 and the portion cut away is taken between the piece 57 and the slide 63, which latter has a cross motion counteracted by the spring 64, adjustable by means of the nut 65. The knife 62 and the strip 51 are kept in place by the bolts 66. The pieces 57, 58 and 61 may be changed to suit the length of the bar to be stamped. The slide 56 has on its upper portion (Figs. 1, 2, 4), a projection 67 which during the cross movement works on a roll 68 which tilts the stop lever 69 against the action of spring 70 to clear a path to the stamp. The two eccentrics 71 and 72 (Figs. 1, 3 and 5) keyed on 35, having the stems linked at 73 and 74 loosely slide on the transeverse rods 75 and 76 (Fig. 1) and bring away from the central axis the piece 77 abutting against the rings 78 and 79 fixed on the rods 75 and 76 themselves and coming back thereupon in their former position under the action of the springs 80 and 81. The rods 75 and 76 slide in the bearings 82 and 83 (Fig. 4) and fastened by means of insulating bushings and washers to the block 77. The contact block 77 slides on the base 84 bolted to and insulated from the casing by means of insulating washers and bushings. Said two contact blocks tightly hold the interchangeable contacts 86 (Fig. 4), which can be adjusted and tightened in place by bolts 87 so as to clamp the portion of the bar to be stamped.

To these contact blocks are bolted the terminals of the secondary of a low voltage transformer 88. The transformer 88 is bolted inside the casing. A second transformer 89 supplies current to the movable contacts 36 and 37. On the end of the shaft 35 is keyed the disk 90 (Figs. 1, 13 and 4), from which a sector 91 of rough material projects and at a given moment drives the roll 92, which by means of the shaft 93 and pinions 94 and 95 drives the feeding drums 96 and 97, which feed the bar 43 into the machine. The adherence of those rolls 96 and 97 is secured by the set screws 98 and 99 and the springs 100—101. On the primary of the transformer 88 and 89 are inserted an automatic switch, an amperemeter and voltmeter, installed on a switchboard.

On the rear portion of the machine, on an insulating plate, voltage controlling apparatus 102 and 103 are mounted for respectively independently adjusting the two transformers 88 and 89. On the opposite side another plate is arranged on which is mounted a switch with oscillating arm at 104 which establishes the contact between the part 105 and 106 or 107 and 108, while two contact levers 113 and 114 are alternatively brought into contact with the contacts 106 or 105 and 107 or 108. The transformers 85 or 89 are inserted between the contacts 105 and 106 and according to the position of the contact levers are switched in the transformer 88 or 89; 116 is a brake for better controlling the press.

S is the main switch, V is a voltmeter,

A the amperemeter, the dotted lines in the commutator show the position of the lever 113—114—104 in the starting period with only the transformer 88 switched in by the regulator 102. 109 is a controller arranged on the ends of the primary winding of the transformers 88 and 89. The dotted lines of the lever 110 of this controller 102 relates to the starting position and control of the magnet 25.

The solid lines show the positions of the contact lever 113—114—104 in the working periods. The length 110 of controller 109 shown in solid line, is inserted in the transformer 89 for controlling the magnet 25 during the working period.

The machine works as follows: The interchangeable pieces 57, 58, 61 are chosen and fastened in place according to the length of the shank of the piece to be stamped. The lever 69 (Fig. 4) is adjusted in place to stop the bar 46 according to a given length. The chosen pieces and the knife 47 are held in place by the screws 59. The contacts 86 are fastened by bolts 87 in such position as to heat successive portions of the bar which are then to be subjected to the stamping action. The contacts 86 may be in number of four or more according to the length and diameter of the piece to be stamped. The strength of the current and the necessary length of the heating period are determined by experience and depend upon the size of the part to be heated. The control apparatus 102 and 103 are adjusted for a given strength of current. The heating period of time is controlled by displacing the studs 14 which rotate the trip wheel 11. The strength and the length of the heating period of time may be better adjusted by the screw and index 29. After the machine is adjusted the flywheel can be started. A bar 46 is introduced between the feeding rolls 96 and 97 and the transformers are switched in. The switch 104 is switched between the two stops 105 and 106, the switch 113 is brought on 105. The electromagnet 25 is switched in the first transformer 88; as the trip gear is working, the machine turns free, while the feeding mechanism feeds in the bar 46 until this is stopped by the lever 69. Now the switch 104 is switched between 108 and 107 and the switch 114 on 108, the switch 113 on 107; the automatic work goes on as follows:

The movable armature 26 is attracted by the magnet 25. The opposite portion of the lever 27 leaves the ring 30, the axle 12 under the action of the spring 15 lowers; the notches 17 mesh with the studs 14 of the flywheel, and the wheel 11 turns therewith, and during its rotary motion drives the pinion 21 by means of the toothed sector 20 thus raising lever 23 and the nose 8 therewith; the movable key 7 under the action of the spring 9 turns and enters one of the grooves 5 of the ring 3, keyed to the flywheel and the shaft which heretofore was stationary, is now rotated.

The bevel gear wheel 34 keyed on the shaft 1 drives the other gear keyed on the camshaft 35, the cam 55 brings the cross-slide 56 to the central part of the machine and the portion to be stamped is sheared off by the knife 62 and squeezed between the pieces 57—58—61 which brings it in line with the center of the machine and facing the stamp 33. At this moment the cross slide 56 by effect of the cam 55 stops. The projection 67 bolted on the slide 56 strikes the ring 68 and the stop lever 69 rotates; thereby its end is driven away from the center. At the same time when this first motion occurs the cams 41 and 42 by means of the levers 44 and 39 and of the side rods 38 and the rod 43 displace the contacts 45 of the arms 36 and 37 from each other, so giving free passage to the stamp. The slide 32 at the end of its motion exerts a pressure upon and stamps the heated portion of the bar which projects out from the piece 58 and 61. As soon as the slide 32 begins the return movement to its original position the cam 55 acts on the rolling pin 112 and pushes the cross slide 56 away from the center.

The projecting part of the bar forwarding disk 91 comes in frictional engagement with the cylinder 92 and through the axis 93, the pinions 94 and 95 and the feeding wheels 96 and 97 a fresh portion of bar is driven inside the machine; at the same time the eccentrics 71 and 72 reach the end of their stroke, the links 73 and 74 strike the rings 78 and 79 and the contact block 77 is brought away from the bar 46, which becomes free. During the back motion of the slide 56, the stamped piece comes in alinement with the bar 46 and is pushed forward by the latter. The piece 63 stops when the strip 115 (Fig. 15) abuts against the wall of the machine. At the same time the cam 47 acts on roll 52, the levers 49 lower, the ejector 48 in its quick downward motion drops the stamped piece in the collector 54. The levers 49 return back in their stop position under the action of the spring 70. The bar 46 which follows its motion is stopped by the lever 69 which under the action of the spring 70 has come again in its stop position. The cams 41 and 42 reach their end of the cycle and the arms 39 and 44 are brought back in the stop position shown in the Fig. 10. The eccentrics 71 and 72 in their rotation have released the rings 78 and 79, the block 77 under the action of the springs 80 and 81 return in the contact position. Under the action of the spring 43 (Fig. 4) the rods 38 and 43 are imparted opposite motions and the movable contacts 36 and 37 return in their contact position at the end of the bar 46. Current flows through the bar and when a given strength is reached the electromagnet 25 works and the above cycle of work begins again.

Of course the details of construction and the arrangement of the parts may vary from these described, and shown, according to the requirements of the special pieces to be stamped without departing from the spirit of the invention.

Having now described my invention and how the same is to be carried out, what I claim as my invention, is:

1. An automatic metal stamping machine for stamping from metal bars, having an electromagnet which electrically controls the operation of the different members, including the stamping members, and the gradual heating of the bar to be stamped.

2. In a metal stamping machine, in combination, means for feeding in the metal, means for cutting the metal, and means for electrically heating said metal a plurality of times before it is subjected to the cutting operation.

3. In a metal stamping machine, in combination, means for feeding in the metal, means for electrically heating said metal a plurality of times, means for cutting such metal, and means for stamping it.

4. In a metal stamping machine, in combination, means for feeding in the metal, means for cutting the metal, means for electrically heating said metal a plurality of times before it is subjected to the cutting operation, and an electromagnet for automatically controlling the operation of all said means.

5. In a metal stamping machine, in combination, means for feeding in the metal, means for electrically heating said metal a plurality of times, means for cutting said metal, means for stamping it, and an electromagnet for automatically controlling the operation of all said means.

6. In a metal stamping machine, in combination, means for feeding in the metal, means for electrically heating the metal a plurality of times, means for cutting said metal, means for stamping said metal, and means for periodically actuating all said means.

7. In a metal stamping machine, in combination, means for feeding in the metal, means for electrically heating the metal a plurality of times, means for cutting said metal, means for stamping said metal, and automatic means for periodically actuating all said means.

8. In a metal stamping machine, in combination, means for feeding in the metal, means for electrically heating the metal a plurality of times, means for cutting said metal, means for stamping said metal, and electrically controlled means for periodically actuating all said means.

9. In a metal stamping machine, in combination, means for feeding in the metal, means for electrically heating the metal a plurality of times, means for cutting said metal, means for stamping said metal, means for periodically actuating all said means, and means for regulating the duration of the heating periods.

10. In an automatic metal stamping machine, a crank shaft, driven by a fly wheel by means of an electromagnetic trip gear; a press to form the products, driven by the crank shaft; a cam shaft actuated by the crank shaft, and having cams which drive the closing and opening of the contact jaws designed to squeeze and heat the metal to be treated; a cam actuated ejector for the stamped pieces; cam actuated shearing mechanism, which cuts off the piece to be stamped, brings it in alinement with the stamp, and carries it again under the ejector; two eccentrics which close and open two contact blocks, which latter clamp and gradually preheat the metal to be stamped; a disk with a projecting sector adapted to periodically rotate the rolls for feeding in the metal to be stamped; a projection, bolted on the cross movable slide carrying the shearing mechanism, for stopping the metal after the desired length has passed in; two transformers, one connected with the reciprocating jaws, the other with the contact blocks, to provide the heating current for the preheating of the metal to be stamped; an electromagnet for the control of the electromagnet trip gear, which latter controls the periodic coupling of the crankshaft and consequently of the camshaft; switches to switch in the current in the electromagnet's and transformer's circuit; a number of studs adjustably arranged on the hub of the flywheel in a circle concentric to the axis of the fly wheel and crank shaft, in such manner that all or part of them may be adjusted to engage the wheel which controls the coupling of the flywheel with the crankshaft, to control the time of flow of current through the metal to be treated.

11. The method of forging an article from a metal bar which consists in electrically heating the metal a plurality of times, cutting off a blank of the desired length, and then subjecting the blank to the forging operation.

In testimony whereof I affix my signature.

JEAN BILL.